United States Patent
Kushnir et al.

(10) Patent No.: US 12,355,859 B2
(45) Date of Patent: Jul. 8, 2025

(54) SECURE REORDERING USING TENSOR OF INDICATORS

(71) Applicant: International Business Machines Corporation, Armonk, NY (US)

(72) Inventors: Eyal Kushnir, Kfar Vradim (IL); Hayim Shaul, Kfar Saba (IL); Omri Soceanu, Haifa (IL); Ehud Aharoni, Kfar Saba (IL); Nathalie Baracaldo Angel, San Jose, CA (US); Runhua Xu, Pittsburgh, PA (US); Heiko H. Ludwig, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 397 days.

(21) Appl. No.: 17/895,711

(22) Filed: Aug. 25, 2022

(65) Prior Publication Data
US 2024/0089081 A1    Mar. 14, 2024

(51) Int. Cl.
*H04L 9/00* (2022.01)
*G06F 7/24* (2006.01)
*G06F 21/60* (2013.01)

(52) U.S. Cl.
CPC ............ *H04L 9/008* (2013.01); *G06F 7/24* (2013.01); *G06F 21/602* (2013.01)

(58) Field of Classification Search
CPC ........... H04L 9/008; G06F 7/24; G06F 21/602
See application file for complete search history.

(56) References Cited

U.S. PATENT DOCUMENTS

2022/0108177 A1* 4/2022 Samek ............... G06N 3/045
2023/0113896 A1* 4/2023 Milazzo ............. H04L 9/085
                                                                713/164

FOREIGN PATENT DOCUMENTS

| CN | 111178538 A | 5/2020 |
| CN | 111402095 A | 7/2020 |
| CN | 112633367   | 4/2021 |
| WO | 2021/092977 A1 | 5/2021 |

OTHER PUBLICATIONS

"Ayantika Chatterjee, Manish Kaushal, and Indranil Sengupta; Accelerating Sorting of Fully Homomorphic Encrypted Data; 2013; 262-273" (Year: 2013).*

Aharoni et al. "HeLayers: A Tile Tensors Frameworks for Large Neural Networks on Encrypted Data", Proceedings on Privacy Enhancing Technologies, 2023, pp. 325-342.

çetin et al. "Homomorphic Sorting with Better Scalability" IEEE Transactions on Parallel and Distributed Systems, 2020, pp. 760-771, vol. 32, No. 4.

Emmadi et al. "Updates on sorting of fully homomorphic encrypted data" 2015 International Conference on Cloud Computing Research and Innovation (ICCCRI), 2015, 6 pages.

(Continued)

*Primary Examiner* — Mohammed Waliullah
(74) *Attorney, Agent, or Firm* — Michael A. Petrocelli (57) ABSTRACT

An example system includes a processor to compute a tensor of indicators indicating a presence of partial sums in an encrypted vector of indicators. The processor can also securely reorder an encrypted array based on the computed tensor of indicators to generate a reordered encrypted array.

18 Claims, 5 Drawing Sheets

(56) References Cited

OTHER PUBLICATIONS

Hardy et al. "Private federated learning on vertically partitioned data via entity resolution and additively homomorphic encryption." arXiv preprint arXiv:1711.10677, Nov. 29, 2017, 60 pages.
Ou et al. A homomorphic-encryption-based vertical federated learning scheme for rick management, Computer Science and Information Systems, 2020, pp. 819-834.
Zhang et al. "Batchcrypt: Efficient homomorphic encryption for cross-silo federated learning" Annual Technical Conference ({USENIX}{ATC} 20), 2020, 15 pages.

* cited by examiner

SECURE REORDERING USING TENSOR OF INDICATORS

BACKGROUND

The present techniques relate to secure reordering or partial sorting of data. More specifically, the techniques relate to secure compaction.

SUMMARY

According to an embodiment described herein, a system can include processor to compute a tensor of indicators indicating a presence of partial sums in an encrypted vector of indicators. The processor can also further securely reorder an encrypted array based on the computed tensor of indicators to generate a reordered encrypted array.

According to another embodiment described herein, a method can include receiving, via a processor, an encrypted array to be securely partially sorted and an encrypted vector of indicators. The method can further include computing, via the processor, a tensor of indicators indicating a presence of partial sums in the encrypted vector of indicators. The method can also further include securely reordering, via the processor, the encrypted array based on the computed tensor of indicators to generate a reordered encrypted array.

According to another embodiment described herein, a computer program product for secure partial sorting can include computer-readable storage medium having program code embodied therewith. The program code executable by a processor to cause the processor to receive an encrypted array to be securely partially sorted and an encrypted vector of indicators. The program code can also cause the processor to compute a tensor of indicators indicating a presence of partial sums in the encrypted vector of indicators. The program code can also cause the processor to securely reorder the encrypted array based on the computed tensor of indicators to generate a reordered encrypted array.

DETAILED DESCRIPTION

After securely computing the intersection of two or more datasets, a system may then seek to securely sort each dataset such that the samples which are in the intersection will appear first in the encrypted dataset while preserving relative order. However, simply modifying the sorting algorithm may generate a circuit that is very deep. For example, if the length of the vectors is n, then the resulting circuit may have a depth of n $\log^2(n)$. Furthermore, this modified sorting algorithm may not preserve the original order of the values. For example, the order of values in either the intersection set or non-intersecting set may be in a different relative order than they were in their original datasets. Moreover, providing unique values by adding more bits to the indicator vector to guarantee such ordering may result in a more complex comparison of the indicator vectors because more bits are involved. For example, the resulting circuit may have a depth of $\log^3(n)$. Moreover, depth of circuits has various effects in the fully homomorphic encryption (FHE) domain.

Existing solutions for partial sorting in Federated Learning use a trusted third party. Although there are ways for hiding the records content from that third party, the third party may still exposed to some valuable information. For example, the third party may know the size of the intersection. Other solutions that use homomorphic encryption for federated learning specifically avoid vertical federated learning due to the complexity in solving it using HE. Some solutions may use HE vertical training, however, in order to avoid the complexity above they reveal to the arbiter the aggregated models, thus compromising privacy. Sorting using generic sorting algorithms with FHE solves a generic problem, and is thus unable to make any assumptions on the data and specifically not the assumptions derived from the federated learning problem. And so, for this specific problem they are order of magnitude slower and requires much more storage.

According to embodiments of the present disclosure, a system includes a processor that can compute a tensor of indicators indicating a presence of partial sums in an encrypted vector of indicators. The processor can also securely reorder an encrypted array based on the computed tensor of indicators to generate a reordered encrypted array. Thus, the embodiments enable secure compaction under fully homomorphic encryption (FHE). In particular, the given dataset and indicator vector are encrypted, and the compaction is performed on the ciphertexts without revealing any information to the executer. Moreover, embodiments of the present disclosure allow the generation of a circuit with a depth of only log(n). The circuit may thus incur less noise run faster when processing using approximated HE schemes, such as the Cheon-Kim-Kim-Song (CKKS) scheme. When implemented with exact FHE schemes, such as the Brakerski-Gentry-Vaikuntanathan (BGV) scheme, the Brakerski-Fan-Vercauteren (BFV) scheme, or Brakerski-Vaikuntanathan (BV) scheme, then the parameters of the encryption key can be relaxed and the resulting system may run faster with a shallower circuit. The techniques may be particularly useful for Federated Learning applications, where a system may run a learning algorithm only on shared samples, without disclosing the intersection to the participants. The techniques may also allow the performance of partial sorting without disclosing any information to any third party.

Figure 1:
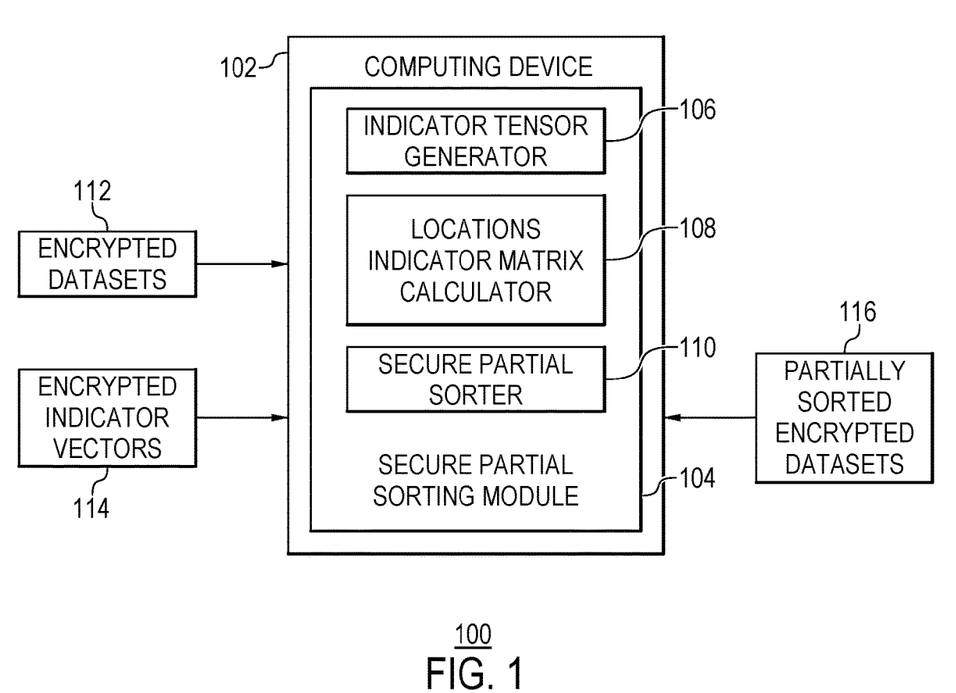
FIG. 1 is a block diagram of an example system for secure partial sorting using a tensor of indicators.

With reference now to FIG. 1, a block diagram shows an example system for secure partial sorting using a tensor of indicators. The example system is generally referred to by the reference number 100. FIG. 1 includes a computing device 102. The computing device 102 includes a secure partial sorting module 104. The secure partial sorting module 104 includes an indicator tensor generator 106, a locations indicator matrix calculator 108, and a secure partial sorter 110. The computing device 102 is shown receiving encrypted datasets 112 and encrypted indicator vectors 114 and generating partially sorted encrypted datasets. For example, the encrypted datasets 112, the encrypted indicator vectors 114, and the partially sorted encrypted datasets 116 may be ciphertexts encrypted using fully homomorphic encryption. In some examples, the encrypted datasets 112 may include encrypted arrays, encrypted databases, encrypted program code, among other data to be partially sorted. In various examples, the encrypted indicator vectors 114 may indicate an intersection of values between two or more sets of data within a particular encrypted dataset 112.

In the example of FIG. 1, the computing device 102 includes a secure partial sorting module 104 that can generate a partially sorted encrypted datasets 116 based on the received encrypted datasets 112 and corresponding encrypted indicator vectors 114. In particular, given an encrypted indicator vector 114 representing an intersection in datasets of any number of participants, the indicator tensor generator 106 of the computing device 112 can compute an encrypted tensor of indicators, referred to as an indicators tensor. As one example, the computing device 112 may be a server that runs the compaction algorithm locally on preprocessed encrypted data given by a user. In various examples, the indicators tensor indicates whether a specific partial sum exists in a given vector of indicators 114. For example, the (i,j,k) slot in the indicators tensor may be equal to 1 if and only if there are exactly k 1s in slots i to i+j in the input vector. The locations indicator matrix calculator 108 can then compute an encrypted locations indicators matrix that indicates the mapping of each sample in the sorted output. Finally, the secure partial sorter 110 of the computing device 102 can reorder the dataset such that the samples which are in the intersection indicated by 1's the intersection indicators vector appear first, and the rest of the rows are encryptions of 0s.

Still referring to FIG. 1, the indicator tensor generator 106 can securely compute an encrypted tensor of indicators. For example, each of the indicator tensors may indicate the existence of each partial sum in the encrypted indicator vectors 114. In various examples, an encrypted tensor of indicators may be generated for each of the encrypted datasets 112. For example, the indicator tensor generator 106 may securely compute the encrypted tensor of indicators using a method P=partialSumsIndicators(A), which takes an encrypted binary valued vector A[N, 1], and produces a tensor P[N, N, N]. In various examples, each element (START, LENGTH, COUNT) of this tensor is an indicator that indicates whether A[START:START+LENGTH] contains exactly COUNT 1s. In some examples, the values of P can be calculated by the following recursive formula:

$$P[\text{START}, 1, 0] = 1 - A[\text{START}], \forall \text{ START} \in [N] \quad \text{Eq. 1}$$

$$P[\text{START}, 1, 1] = A[\text{START}], \forall \text{ START} \in [N]$$

$$P[\text{START}, \text{LENGTH}, \text{COUNT}] = 0, \forall \text{ COUNT} > \text{LENGTH}$$

$$P[\text{START}, \text{LENGTH}, \text{COUNT}] = \sum_{i=0}^{\text{COUNT}} P\left[\text{START}, \left\lceil \frac{\text{LENGTH}}{2} \right\rceil, i\right] \cdot$$

-continued $$P\left[\text{START} + \left\lceil \frac{\text{LENGTH}}{2} \right\rceil, \left\lfloor \frac{\text{LENGTH}}{2} \right\rfloor, \text{COUNT} - i\right], \text{else}$$

In various examples, the input vector A is packed as a vector of ciphertexts in interleaved manner. For example, if the number of slots in each ciphertext is 4, and the length of the input vector is 9, then the following ciphertexts may be obtained: $[[a_1, a_4, a_7, ?], [a_2, a_5, a_8, ?], [a_3, a_6, a_9, ?]]$, where '?' denotes an unknown value. Using the Tile Tensor notation first introduced by Aharoni et al., the shape of the input is $$\left[\frac{N^\sim}{\text{SLOTS}}, 1\right],$$

where SLOTS is the number of slots in a ciphertext. The shape of the external tensor, which is the tensor containing the ciphertexts, of the input is $$\left[\left[\frac{N}{\text{SLOTS}}\right], 1\right].$$

An output tensor may thus be packed as a tensor of ciphertexts, where the first dimension is packed in interleaved way. In Tile Tensor notation, the shape of the output is $$\left[\frac{N^\sim}{\text{SLOTS}}, N, N\right].$$

The shape of the external tensor of the output is $$\left[\left[\frac{N}{\text{SLOTS}}\right], N, N\right]$$

and each ciphertext is also referred to herein as a tile. Given external input tensor denote by A', an external output tensor denoted by P', and denoted $$\text{TILES} = \left[\frac{N}{\text{SLOTS}}\right],$$

then the indicator tensor generator 106 can calculate P using the following Algorithm 1:

---

Algorithm 1

---

For each i ∈ [TILES] do P'[i, 1, 0] ← 1-A'[i]
For each i ∈ [TILES] do P'[i, 1, 1] ← A'[i]
For each 2 ≤ LENGTH ≤ N do Algorithm 1

For each $0 \leq \text{COUNT} \leq \left\lfloor \frac{\text{LENGTH}}{2} \right\rfloor$ do
  For each $i \in [\text{TILES}]$ do
    $P'[i, \text{LENGTH}, \text{COUNT}] \leftarrow$ $$\sum_{k=0}^{COUNT} P'\left[i, \left\lceil \frac{LENGTH}{2} \right\rceil, k\right] \cdot \text{rot}\left(P'\left[i + \left\lceil \frac{LENGTH}{2} \right\rceil (\text{mod TILES}), \left\lfloor \frac{LENGTH}{2} \right\rfloor, COUNT - k\right], \left\lfloor \frac{i + \left\lceil \frac{LENGTH}{2} \right\rceil}{TILES} \right\rfloor\right)$$

For each $\left\lfloor \frac{\text{LENGTH}}{2} \right\rfloor < \text{COUNT} \leq \text{LENGTH}$ do
  For each $i \in [\text{TILES}]$ do
    $P'[i, \text{LENGTH}, \text{COUNT}] \leftarrow$ $$\sum_{k=0}^{LENGTH-COUNT} P'\left[i, \left\lceil \frac{LENGTH}{2} \right\rceil, COUNT - \left\lfloor \frac{LENGTH}{2} \right\rfloor + k\right]$$

$$\cdot \text{rot}\left(P'\left[i + \left\lceil \frac{LENGTH}{2} \right\rceil (\text{mod TILES}), \left\lfloor \frac{LENGTH}{2} \right\rfloor, \left\lfloor \frac{LENGTH}{2} \right\rfloor - k\right], \left\lfloor \frac{i + \left\lceil \frac{LENGTH}{2} \right\rceil}{TILES} \right\rfloor\right)$$

where Algorithm 1 uses homomorphic encryption multiplication, add, and rotate operations. Accordingly, the complexity of the Algorithm 1 is $O(N^4)$ homomorphic operations.

The locations indicator matrix calculator 108 can then securely compute an encrypted locations indicators matrix, which indicates a new mapping of each sample. For example, the locations indicator matrix calculator 108 can produce the locations indicators matrix L[1, N, N] by element-wise multiplication of P[0] (which is 1×N×N matrix) by $A^T$ broadcasted. For example, the locations indicator matrix calculator 108 can compute the encrypted locations indicators matrix using the equation:

$$L[0,i,j] = P[0,i,j] \cdot A[i] \qquad \text{Eq. 2}$$

Thus, L[0, i, j] is be equal to 1 if and only if the i'th record is in the intersection, and there are exactly j−1 samples in the intersection with index smaller than i. In other words, L[0, i, j] will be equal to 1 if and only if the i'th record should be mapped to the j'th row in the output dataset.

The secure partial sorter 110 can then securely calculate an encrypted dataset, such that the samples which are in the intersection as indicated by the intersection indicators vector appear first, and the rest of the rows are encryptions of 0s. For example, given a dataset matrix M[N, F] where F is the number of features for each sample, the secure partial sorter 110 can calculate the encrypted output dataset by matrix multiplication of $M^T$ and L. In some example, the secure partial sorter 110 may achieve this by element-wise multiplication of $M^T$ broadcasted and L, followed by summation over the second dimension of the result, to get a F×1×N encrypted matrix. Finally, the secure partial sorter 110 can remove the second dimension and transpose the result to get the encrypted matrix M'[N, T]. As one example, the secure partial sorter 110 may securely calculate the encrypted dataset using the equation:

$$M'[i,j] = \Sigma_{k=0}^{N} M[k,j] \cdot L[0,k,i] \qquad \text{Eq. 3}$$

In various examples, since L[0, k, i] is equal to 1 if and only if the k'th record is mapped to the i'th row in the output dataset, Eq. 3 provides the correct result.

In various examples, the system 100 may more specifically perform a compaction of a database. For example, the system 100 may be perform the compaction of the database using the following example overall Algorithm 2:

Algorithm 2

Input: Database A and encrypted indicator vector $[\![\chi]\!]$.
Output: The compacted encrypted database $[\![A]\!]$
1   for each $s \in [n]$ do
2     $[\![P_{s,1,0}]\!] := 1 - [\![\chi[s]]\!]$
3     $[\![P_{s,1,1}]\!] := [\![\chi[s]]\!]$
4     for each $c = 2, \ldots n$ do
5       $[\![P_s,1,c]\!] := [\![0]\!]$
6   for each $l = 2, \ldots, n$ do
7     for each $c = 0, \ldots, l$ do
8       for each $s = 1, \ldots n$ do
9

$$[\![P_{s,l,c}]\!] := \sum_{j=0}^{c} \left[\!\left[P_{s,\left\lceil\frac{l}{2}\right\rceil,j}\right]\!\right] \cdot \left[\!\left[P_{s+\left\lceil\frac{l}{2}\right\rceil,\left\lfloor\frac{l}{2}\right\rfloor,c-j}\right]\!\right]$$

10   for each $k = 1, \ldots, n$ do

11     $[\![A[k]]\!] := \sum_{i=1}^{n} [\![\chi[i]]\!] \cdot [\![P_{0,i-1,k-1}]\!] \cdot A[i]$ 12   Output $[\![A]\!]$ where s is start, c is count, and l is length, $P_{s,l,c}$ is a three-dimensional tensor with a value of 0 or 1 for each combination of s, l, and c, and $[\![\ ]\!]$ indicates an encrypted ciphertext. In Algorithm 2, compaction is performed in a circuit whose multiplicative depth is log 2 n. In various examples, in order to compact this circuit, Algorithm 2 computes the three-dimensional n×n×n tensor $P_{s,l,c}$ using the Equation:

$$P_{s,l,c} = \begin{cases} 1 & \text{if } \sum_{i=s}^{s+l-1} \chi[i] = c \\ 0 & \text{otherwise} \end{cases} \qquad \text{Eq. 4}$$

In general, for Algorithm 2, $P_{s,l,c} = 1$ if an only if there are c 1's in $[s], \ldots, \chi[s+l-1]$. As shown above, Algorithm 2 computes P recursively. Otherwise, $P_{s,l,c}=0$. Eventually, $P_{1,-1,c} \cdot \chi[1]=1$ if and only if $\chi[1]$ is the c-th instance used for the compaction. In particular, the Algorithm 2 may start by initializing $P_{s,1,c}$, setting $P_{s,1,0}=1$ if $\chi[s]=0$ as shown at Line 2, to $P_{s,1,1}=1$ if $\chi[s]=1$ as shown at Line 3, and $P_{s,1,c}=0$ for c>1 as shown at Line 5. In various examples, at lines 6-9, Algorithm 2 computes $P_{s,l,c}$ for l>1 using a recursion rule that divides the range $\chi[s], \ldots, \chi[s+l-1]$ into two ranges:

$$\chi[s], \ldots, \chi\left[s+\left\lceil\frac{l}{2}\right\rceil-1\right] \text{ and } \chi\left[s\left\lceil\frac{l}{2}\right\rceil\right], \ldots, \chi[s+l-1]$$

and checks that these ranges have j and c-j number of 1's. Finally, Algorithm 2 compacts the database A in Lines 10-11 by setting:

$$[\![\overline{A[k]}]\!] := \Sigma_{i=1}[\![\chi[i]]\!] [\![P_{0,i-1,k-1}]\!] \cdot A[i] \qquad \text{Eq. 5}$$

Thus, $P_{0,i-1,k-1}=1$ if and only if there are (k−1) 1's in $\chi[1], \ldots, \chi[i-1]$. Therefore, $[i] \cdot P0,i-1,k-1=1$ if and only if $\chi[i]$ is the k-th 1 in $\chi[1], \ldots, \chi[i]$.

It is to be understood that the block diagram of FIG. 1 is not intended to indicate that the system 100 is to include all of the components shown in FIG. 1. Rather, the system 100 can include fewer or additional components not illustrated in FIG. 1 (e.g., additional computing devices, datasets, vectors, or additional output partially sorted encrypted datasets, etc.).

Figure 2:
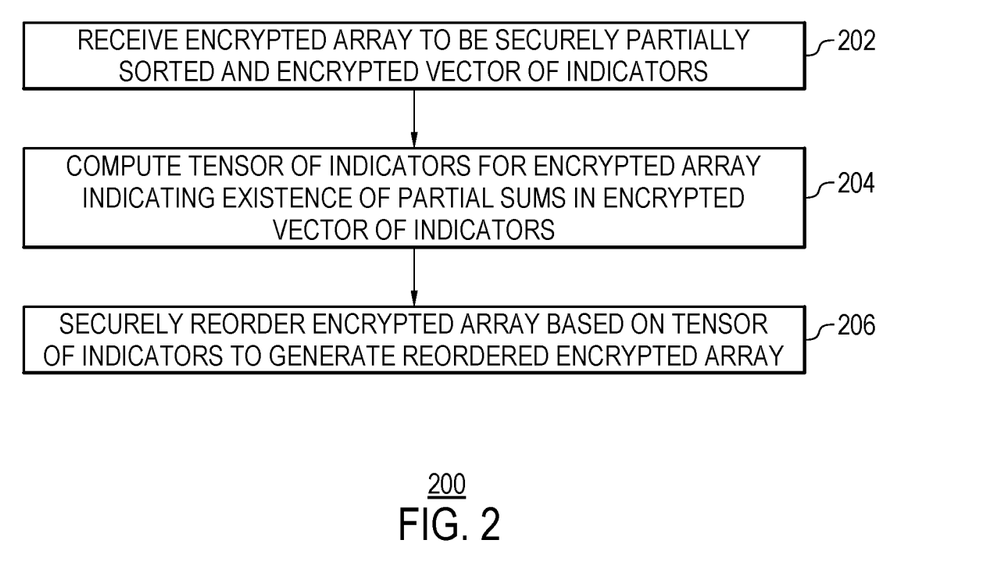
FIG. 2 is a process flow diagram of an example method that can securely partially sort data using tensors of indicators.

FIG. 2 is a process flow diagram of an example method that can securely partially sort data using tensors of indicators. The method 200 can be implemented with any suitable computing device, such as the computing device 400 of FIG. 4 and is described with reference to the system 100 of FIG. 1. For example, the methods described below can be implemented by the processor set 410 or the processor 502 of FIG. 4 or 5.

At block 202, a processor receives an encrypted array to be securely partially sorted and an encrypted vector of indicators. In some examples, the encrypted vector of indicators may indicate an intersection between two vectors of values in a dataset. For example, the encrypted vector of indicators may indicate an intersection between two sets of encrypted arrays. In some examples, the encrypted vector of indicators may indicate an intersection between the encrypted array and a second encrypted array from another dataset. In various examples, the encrypted array and the encrypted vector of indicators may be in the form of ciphertexts encrypted using fully homomorphic encryption. In some examples, the encrypted array may be an encrypted program code. In some examples, the encrypted array may be part of or include an encrypted database.

At block 204, the processor computes a tensor of indicators indicating a presence of partial sums in the encrypted vector of indicators. For example, the processor may compute the tensor of indicators using Algorithm 1 described above.

At block 206, the processor securely reorders the encrypted array based on the computed tensor of indicators to generate a reordered encrypted array. In some examples, the processor can securely partially sort the encrypted array. For example, the processor can securely sort the encrypted array such that the samples that are in an intersection indicated by the encrypted vector of indicators appear first in the encrypted dataset and a relative order of the samples as in the encrypted array is preserved. In some examples, the processor can securely compact a database including the reordered encrypted array. For example, the processor can compute an encrypted locations indicator matrix indicating mapping of each sample in a target partially sorted database including the encrypted array, and partially sort the encrypted dataset based on encrypted locations indicator matrix to generate the partially sorted encrypted database.

The process flow diagram of FIG. 2 is not intended to indicate that the operations of the method 200 are to be executed in any particular order, or that all of the operations of the method 200 are to be included in every case. Additionally, the method 200 can include any suitable number of additional operations. For example, the method may include executing a learning algorithm only on shared samples in the reordered encrypted array.

Figure 3:
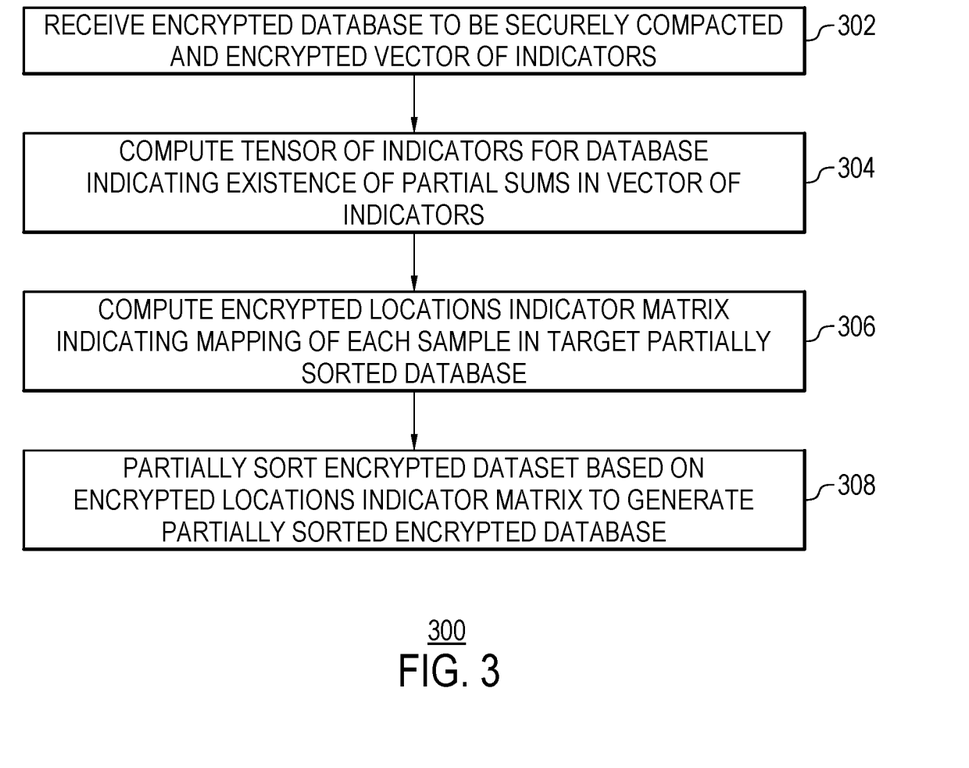
FIG. 3 is a process flow diagram of an example method that can securely compact a database using a tensor of indicators.

FIG. 3 is a process flow diagram of an example method that can securely compact a database using a tensor of indicators. The method 300 can be implemented with any suitable computing device, such as the computing device 400 of FIG. 4 and is described with reference to the system 100 of FIG. 1. For example, the methods described below can be implemented by the processor set 410 or the processor 502 of FIG. 4 or 5.

At block 302, a processor receives an encrypted database to be securely compacted and an encrypted vector of indicators. In some examples, the encrypted vector of indicators may indicate an intersection between vectors of values in the database and another database.

At block 304, the processor computes a tensor of indicators indicating a presence of partial sums in the encrypted vector of indicators. For example, the processor may compute the tensor of indicators using Algorithm 1 described above.

At block 306, the processor computes an encrypted locations indicator matrix indicating mapping of each sample in a target partially sorted database. For example, the processor may compute the encrypted locations indicator matrix using Eq. 2 described above.

At block 308, the processor partially sorts the encrypted database based on encrypted locations indicator matrix to generate a partially sorted encrypted database. For example, the processor can partially sort the encrypted database using Eqs. 3-5 or Algorithm 2 described above.

The process flow diagram of FIG. 3 is not intended to indicate that the operations of the method 300 are to be executed in any particular order, or that all of the operations of the method 300 are to be included in every case. Additionally, the method 300 can include any suitable number of additional operations. For example, the method 300 may include executing learning algorithm only on shared samples in the reordered encrypted array.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 4:
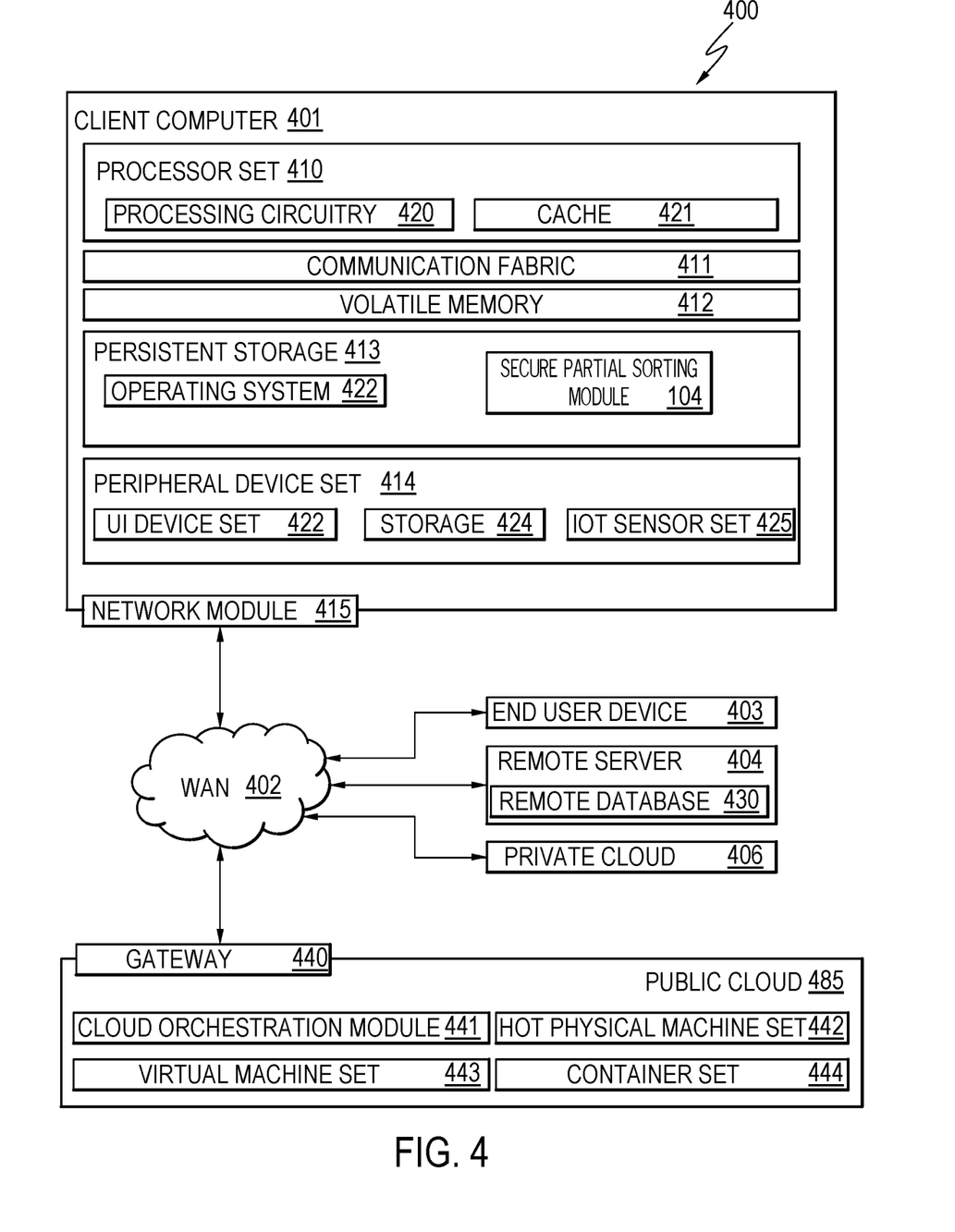
FIG. 4 is a block diagram of an example computing environment that contains an example of an environment for the execution of at least some of the computer code involved in performing the inventive methods, such as securely partially sorting datasets using tensors of indicators.

Computing environment 400 contains an example of an environment for the execution of at least some of the computer code involved in performing the inventive methods, such as secure partial sorting module 104. In addition to block 104, computing environment 400 includes, for example, computer 401, wide area network (WAN) 402, end user device (EUD) 403, remote server 404, public cloud 405, and private cloud 406. In this embodiment, computer 401 includes processor set 410 (including processing circuitry 420 and cache 421), communication fabric 411, volatile memory 412, persistent storage 413 (including operating system 422 and block 200, as identified above), peripheral device set 414 (including user interface (UI), device set 423, storage 424, and Internet of Things (IoT) sensor set 425), and network module 415. Remote server 404 includes remote database 430. Public cloud 405 includes gateway 440, cloud orchestration module 441, host physical machine set 442, virtual machine set 443, and container set 444.

COMPUTER 401 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 430. As is well understood in the art of computer technology, and depending upon the technology, performance of a computer-implemented method may be distributed among multiple computers and/or between multiple locations. On the other hand, in this presentation of computing environment 400, detailed discussion is focused on a single computer, specifically computer 401, to keep the presentation as simple as possible. Computer 401 may be located in a cloud, even though it is not shown in a cloud in FIG. 4. On the other hand, computer 401 is not required to be in a cloud except to any extent as may be affirmatively indicated.

PROCESSOR SET 410 includes one, or more, computer processors of any type now known or to be developed in the future. Processing circuitry 420 may be distributed over multiple packages, for example, multiple, coordinated integrated circuit chips. Processing circuitry 420 may implement multiple processor threads and/or multiple processor cores. Cache 421 is memory that is located in the processor chip package(s) and is typically used for data or code that should be available for rapid access by the threads or cores running on processor set 410. Cache memories are typically organized into multiple levels depending upon relative proximity to the processing circuitry. Alternatively, some, or all, of the cache for the processor set may be located "off chip." In some computing environments, processor set 410 may be designed for working with qubits and performing quantum computing.

Computer readable program instructions are typically loaded onto computer 401 to cause a series of operational steps to be performed by processor set 410 of computer 401 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 421 and the other storage media discussed below. The program instructions, and associated data, are accessed by processor set 410 to control and direct performance of the inventive methods. In computing environment 400, at least some of the instructions for performing the inventive methods may be stored in block 104 in persistent storage 413.

COMMUNICATION FABRIC 411 is the signal conduction paths that allow the various components of computer 401 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 412 is any type of volatile memory now known or to be developed in the future. Examples include dynamic type random access memory (RAM) or static type RAM. Typically, the volatile memory is characterized by random access, but this is not required unless affirmatively indicated. In computer 401, the volatile memory 412 is located in a single package and is internal to computer 401, but, alternatively or additionally, the volatile memory may be distributed over multiple packages and/or located externally with respect to computer 401.

PERSISTENT STORAGE 413 is any form of non-volatile storage for computers that is now known or to be developed in the future. The non-volatility of this storage means that the stored data is maintained regardless of whether power is being supplied to computer 401 and/or directly to persistent storage 413. Persistent storage 413 may be a read only memory (ROM), but typically at least a portion of the persistent storage allows writing of data, deletion of data and re-writing of data. Some familiar forms of persistent storage include magnetic disks and solid state storage devices. Operating system 422 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 414 includes the set of peripheral devices of computer 401. Data communication connections between the peripheral devices and the other components of computer 401 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 423 may include components such as a display screen, speaker, microphone, wearable devices (such as goggles and smart watches), keyboard, mouse, printer, touchpad, game controllers, and haptic devices. Storage 424 is external storage, such as an external hard drive, or insertable storage, such as an SD card. Storage 424 may be persistent and/or volatile. In some embodiments, storage 424 may take the form of a quantum computing storage device for storing data in the form of qubits. In embodiments where computer 401 is required to have a large amount of storage (for example, where computer 401 locally stores and manages a large database) then this storage may be provided by peripheral storage devices designed for storing very large amounts of data, such as a storage area network (SAN) that is shared by multiple, geographically distributed computers. IoT sensor set 425 is made up of sensors that can be used in Internet of Things applications. For example, one sensor may be a thermometer and another sensor may be a motion detector.

NETWORK MODULE 415 is the collection of computer software, hardware, and firmware that allows computer 401 to communicate with other computers through WAN 402. Network module 415 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 415 are performed on the same physical hardware device. In other embodiments (for example, embodiments that utilize software-defined networking (SDN)), the control functions and the forwarding functions of network module 415 are performed on physically separate devices, such that the control functions manage several different network hardware devices. Computer readable program instructions for performing the inventive methods can typically be downloaded to computer 401 from an external computer or external storage device through a network adapter card or network interface included in network module 415.

WAN 402 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 403 is any computer system that is used and controlled by an end user (for example, a customer of an enterprise that operates computer 401), and may take any of the forms discussed above in connection with computer 401. EUD 403 typically receives helpful and useful data from the operations of computer 401. For example, in a hypothetical case where computer 401 is designed to provide a recommendation to an end user, this recommendation would typically be communicated from network module 415 of computer 401 through WAN 402 to EUD 403. In this way, EUD 403 can display, or otherwise present, the recommendation to an end user. In some embodiments, EUD 403 may be a client device, such as thin client, heavy client, mainframe computer, desktop computer and so on.

REMOTE SERVER 404 is any computer system that serves at least some data and/or functionality to computer 401. Remote server 404 may be controlled and used by the same entity that operates computer 401. Remote server 404 represents the machine(s) that collect and store helpful and useful data for use by other computers, such as computer 401. For example, in a hypothetical case where computer 401 is designed and programmed to provide a recommendation based on historical data, then this historical data may be provided to computer 401 from remote database 430 of remote server 404.

PUBLIC CLOUD 405 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 405 is performed by the computer hardware and/or software of cloud orchestration module 441. The computing resources provided by public cloud 405 are typically implemented by virtual computing environments that run on various computers making up the computers of host physical machine set 442, which is the universe of physical computers in and/or available to public cloud 405. The virtual computing environments (VCEs) typically take the form of virtual machines from virtual machine set 443 and/or containers from container set 444. It is understood that these VCEs may be stored as images and may be transferred among and between the various physical machine hosts, either as images or after instantiation of the VCE. Cloud orchestration module 441 manages the transfer and storage of images, deploys new instantiations of VCEs and manages active instantiations of VCE deployments. Gateway 440 is the collection of computer software, hardware, and firmware that allows public cloud 405 to communicate through WAN 402.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 406 is similar to public cloud 405, except that the computing resources are only available for use by a single enterprise. While private cloud 406 is depicted as being in communication with WAN 402, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 405 and private cloud 406 are both part of a larger hybrid cloud.

Figure 5:
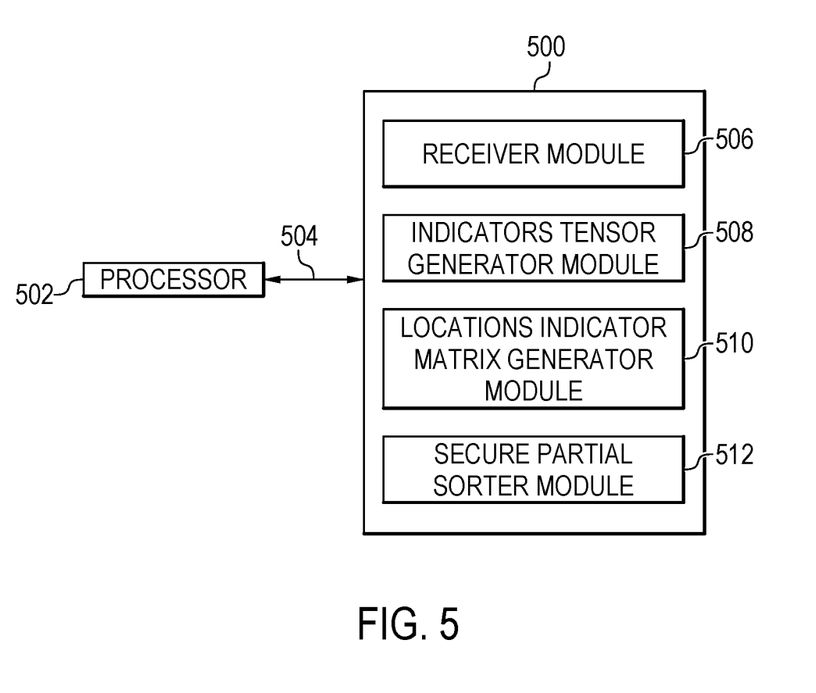
FIG. 5 is an example tangible, non-transitory computer-readable medium that can securely partially sort datasets using tensors of indicators.

Referring now to FIG. 5, a block diagram is depicted of an example tangible, non-transitory computer-readable medium 500 that can securely partially sort datasets using tensors of indicators. The tangible, non-transitory, computer-readable medium 500 may be accessed by a processor 502 over a computer interconnect 504. Furthermore, the tangible, non-transitory, computer-readable medium 500 may include code to direct the processor 502 to perform the operations of the methods 200 or 300 of FIGS. 2 and 3.

The various software components discussed herein may be stored on the tangible, non-transitory, computer-readable medium 500, as indicated in FIG. 5. For example, a receiver module 506 includes code to receive an encrypted array to be securely partially sorted and an encrypted vector of indicators. In some examples, the module 506 also includes code to receive an encrypted database to be securely compacted. An indicators tensor generator module 508 module 508 includes code to compute a tensor of indicators indicating a presence of partial sums in the encrypted vector of indicators. A locations indicator matrix generator module 510 includes code to compute an encrypted locations indicator matrix indicating mapping of each sample in a target partially sorted database including the encrypted array, and partially sort the encrypted dataset based on encrypted locations indicator matrix to generate the partially sorted encrypted database. The module 510 also includes code to. A secure partial sorter module 512 includes code to securely reorder the encrypted array based on the computed tensor of indicators to generate a reordered encrypted array. For example, the secure partial sorter module 512 includes code to securely partially sort the encrypted array. In some examples, the secure partial sorter module 512 includes code to securely compact a database including the reordered encrypted array. In various examples, the secure partial sorter module 512 includes code to securely sort the encrypted array such that the samples that are in an intersection indicated by the encrypted vector of indicators appear first in the encrypted dataset and a relative order of the samples as in the encrypted array is preserved.

It is to be understood that any number of additional software components not shown in FIG. 5 may be included within the tangible, non-transitory, computer-readable media 500, depending on the specific application. For example, the computer-readable media 500 may additionally include a machine learning module (not shown) to execute a learning algorithm only on shared samples in the reordered encrypted array. As one example, such a learning algorithm may be executed in a Vertical Federated Learning (VFL) framework. The VFL framework may enable the participant parties to build a joint machine learning model, from a dataset that is partitioned vertically across the parties. In this example, vertically means that each party has a different set of features, but of the same samples. For example, a two service providers may both have data about similar people, but each one of the providers may have a different type of data. Using VFL, the service providers can jointly train a machine learning (ML) model on their datasets without disclosing their data to one another. One of the challenges in VFL is aligning the samples. Alignment refers to the two service providers first finding their matching samples. For example, the matching samples may correspond to a person who is a customer of both of the service providers. After finding the matching records, the service providers may also make sure that the samples of the matching records appear in the same order. The service providers can use embodiments disclosed herein to ensure the same order. Each service provider can then generate an encrypted indicator vector that indicates which of their samples are in the intersection and thus shared between both of the service providers. Then, using an algorithm such as Algorithm 2, the service providers can produce an encrypted database that contains their own data, but contains only the samples that are in the intersection, and in the same order as the encrypted databases of the other parties.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system, comprising:
a processor set;
a computer-readable medium; and
program instructions stored on the computer-readable medium to cause the processor set to perform operations which comprise:
compute a tensor of indicators indicating a presence of partial sums in an encrypted vector of indicators;
securely reorder an encrypted array based on the computed tensor of indicators to generate a reordered encrypted array; and
securely sort the encrypted array such that samples in an intersection indicated by the encrypted vector of indicators appear first in an encrypted dataset, and a relative order of the samples as in the encrypted array is preserved.

2. The system of claim 1, wherein the encrypted vector of indicators indicates intersections between two vectors of values in a dataset.

3. The system of claim 1, wherein the encrypted vector of indicators indicates intersections between two vectors of values of two datasets associated with different sources.

4. The system of claim 1, wherein the encrypted vector of indicators and encrypted array comprise ciphertexts encrypted using fully homomorphic encryption.

5. The system of claim 1, wherein the processor is to further compute an encrypted locations indicator matrix indicating mapping of each sample in a target partially sorted database comprising the encrypted array, and partially sort the encrypted dataset based on encrypted locations indicator matrix to generate the partially sorted encrypted database.

6. The system of claim 1, wherein the encrypted array comprises an encrypted program code.

7. The system of claim 1, wherein the encrypted array comprises an encrypted database.

8. A computer-implemented method, comprising:
receiving, via a processor, an encrypted array to be securely partially sorted and an encrypted vector of indicators;
computing, via the processor, a tensor of indicators indicating a presence of partial sums in the encrypted vector of indicators;
securely reordering, via the processor, the encrypted array based on the computed tensor of indicators to generate a reordered encrypted array; and
securely sorting the encrypted array such that samples in an intersection indicated by the encrypted vector of indicators appear first in an encrypted dataset, and a relative order of the samples as in the encrypted array is preserved.

9. The computer-implemented method of claim 8, wherein securely reordering the encrypted array comprises securely partially sorting the encrypted array.

10. The computer-implemented method of claim 8, wherein securely reordering the encrypted array comprises securely compacting a database comprising the reordered encrypted array.

11. The computer-implemented method of claim 8, wherein the encrypted vector of indicators indicates an intersection between two sets of encrypted arrays.

12. The computer-implemented method of claim 8, wherein securely reordering the encrypted array comprises computing an encrypted locations indicator matrix indicating mapping of each sample in a target partially sorted database comprising the encrypted array, and partially sorting the encrypted dataset based on encrypted locations indicator matrix to generate the partially sorted encrypted database.

13. The computer-implemented method of claim 8, further comprising executing, via the processor, a learning algorithm only on shared samples in the reordered encrypted array.

14. A computer program product for secure partial sorting, the computer program product comprising a computer-readable storage medium having program code embodied therewith, the program code executable by a processor to cause the processor to:
receive an encrypted array to be securely partially sorted and an encrypted vector of indicators;
compute a tensor of indicators indicating a presence of partial sums in the encrypted vector of indicators;
securely reorder the encrypted array based on the computed tensor of indicators to generate a reordered encrypted array; and
securely sort the encrypted array such that samples in an intersection indicated by
the encrypted vector of indicators appear first in an encrypted dataset, and a relative order of the samples as in the encrypted array is preserved.

15. The computer program product of claim 14, further comprising program code executable by the processor to securely partially sort the encrypted array.

16. The computer program product of claim 14, further comprising program code executable by the processor to securely compact a database comprising the reordered encrypted array.

17. The computer program product of claim 14, further comprising program code executable by the processor to compute an encrypted locations indicator matrix indicating mapping of each sample in a target partially sorted database comprising the encrypted array, and partially sort the encrypted dataset based on encrypted locations indicator matrix to generate the partially sorted encrypted database.

18. The computer program product of claim 14, further comprising program code executable by the processor to execute a learning algorithm only on shared samples in the reordered encrypted array.

\* \* \* \* \*